US009117313B2

(12) United States Patent
Honda

(10) Patent No.: US 9,117,313 B2
(45) Date of Patent: Aug. 25, 2015

(54) IMAGING APPARATUS AND IMAGE PROCESSING METHOD

(75) Inventor: Natsuhito Honda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1404 days.

(21) Appl. No.: 11/165,801

(22) Filed: Jun. 24, 2005

(65) Prior Publication Data

US 2006/0001682 A1 Jan. 5, 2006

(30) Foreign Application Priority Data

Jun. 30, 2004 (JP) ................................ 2004-193142

(51) Int. Cl.
*G06T 3/00* (2006.01)
*G06T 11/60* (2006.01)

(52) U.S. Cl.
CPC ............... *G06T 11/60* (2013.01); *G06T 3/0093* (2013.01); *G06T 2210/44* (2013.01)

(58) Field of Classification Search
CPC .... G06T 2210/44; G06T 3/0093; G06T 13/00
USPC .................................................. 345/473, 646
See application file for complete search history.

(56) References Cited

U.S. PATENT DOCUMENTS

| 5,412,487 | A | * | 5/1995 | Nishimura et al. ........... 358/452 |
| 6,344,907 | B1 | | 2/2002 | Watanabe et al. |
| 6,621,938 | B1 | * | 9/2003 | Tanaka et al. ................. 382/276 |
| 7,171,029 | B2 | * | 1/2007 | Rowe ............................ 382/118 |
| 7,529,428 | B2 | | 5/2009 | Yamada et al. |
| 2003/0164819 | A1 | * | 9/2003 | Waibel .......................... 345/173 |
| 2003/0223622 | A1 | * | 12/2003 | Simon et al. .................. 382/118 |
| 2004/0036689 | A1 | * | 2/2004 | Chiu ............................. 345/473 |
| 2005/0078125 | A1 | | 4/2005 | Yamada et al. |
| 2005/0286799 | A1 | * | 12/2005 | Huang et al. .................. 382/275 |

FOREIGN PATENT DOCUMENTS

| JP | 09140934 A | 6/1997 |
| JP | 09282440 A | 10/1997 |
| JP | 11045332 A | 2/1999 |

(Continued)

OTHER PUBLICATIONS

Benq, "Benq S670C Mobile Phone User's Manual", Jan. 30, 2004, p. 53-57.*
Machine Tranlsation http://translate.googleusercontent.com/translate_c?hi=ja&ie=UTF-8&sl=ja&tl=en&u=http://plusd.it, Mar. 6, 2008.
Japanese language office action dated Nov. 22, 2011 and its English language translation for corresponding Japanese application 2010101446 cites the foreign patent documents above.
Japanese language office action dated Feb. 21, 2012 and its English language translation issued in corresponding Japanese application 2010101446.

(Continued)

*Primary Examiner* — Joni Richer
(74) *Attorney, Agent, or Firm* — Studebaker & Brackett PC

(57) ABSTRACT

An imaging apparatus includes a photographing device for acquiring a created image; and a display device for showing a preview image of the created image. The apparatus may have a control device for superimposing a plurality of outlines on the preview image shown on the display device, and subjecting at least one of areas, which are included in the created image and are surrounded by the outlines in the preview image, to an image transformation process. Alternatively, the apparatus has a control device for superimposing an outline, which corresponds to a synthetic target image indicating a target image of transformation, on the preview image shown on the display device, and subjecting an area, which is included in the created image and is surrounded by the outline in the preview image, to an image transformation process performed based on the synthetic target image.

11 Claims, 13 Drawing Sheets

(56) References Cited

FOREIGN PATENT DOCUMENTS

| | | |
|---|---|---|
| JP | 11185048 A | 7/1999 |
| JP | 2001177799 A | 6/2001 |
| JP | 2002109555 A | 4/2002 |
| JP | 2002-199362 | 7/2002 |
| JP | 2002-300454 | 10/2002 |
| JP | 2003242480 A | 8/2003 |
| JP | 2003-296713 | 10/2003 |
| JP | 2005100139 A | 4/2005 |

OTHER PUBLICATIONS

Japanese language office action (official inquiry) dated Aug. 14, 2012 and its English language translation issued in corresponding Japanese application 2010101446 cites the foreign patent document listed above.

Japanese language office action and its English translation for corresponding Japanese application No. 2004-193142 lists the references above, Sep. 16, 2009.

* cited by examiner

200

IMAGING APPARATUS AND IMAGE PROCESSING METHOD

BACKGROUND OF THE INVENTION

1. Field of the Invention

The present invention relates to an imaging apparatus and an image processing method.

Priority is claimed on Japanese Patent Application No. 2004-193142, filed Jun. 30, 2004, the content of which is incorporated herein by reference.

2. Description of Related Art

As a conventional image transformation processing technique, a morphing method is known, which is used for generating an animation image in computer graphics. In the morphing method, a still image A is associated with another still image B, and feature points are identified in each still image, and transition from the feature points of the still image A to the feature points of the still image B over a period of time is estimated. Coordinates or color data for the transition route are then determined, thereby generating animation image data for an animation, or extracting a still image in the route of the transition, as a transformed image from the original image.

The above morphing method may be applied to a digital camera, that is, an image created by user's photographing operation may be processed by the morphing method so as to obtain a transformed image. Generally, such a digital camera has a liquid crystal panel (i.e., display) for a photographer to confirm a subject to be photographed, and a marking (line) is also shown on the display in addition to the subject. For example, when a contour of the upper half of a human's body is displayed as a marking line and the photographer photographs a human as the subject while adjusting the human's upper half to the marking line, feature points for morphing can be easily determined in the created subject's image as the original image for morphing.

In addition, recently, cellular (or mobile) phones having built-in digital cameras have become wide spread, and photographing can be easily enjoyed, for example, by photographing a human face by using a cellular phone (see Japanese Unexamined Patent Application, First Publication No. 2002-300454).

However, in the conventional morphing process using a marking, detailed requests from users for morphing cannot be satisfied. For example, in the morphing process after photographing a human's face, there is a variety of users' requests such as a request to subject only a specific part such as the eyes, the mouth, or the nose to the morphing process, or a request to subject only specific parts such as the eyes and the mouth to the morphing process. That is, there are various requests for partial morphing of a subject, which are not sufficiently implemented by conventional techniques.

SUMMARY OF THE INVENTION

In light of the above circumstances, an object of the present invention is to provide an imaging apparatus for performing image transformation of a created image, and a relevant image processing method, so as to implement users' detailed requests for image transformation by clearly showing the user target area(s) for image transformation.

Therefore, the present invention provides an imaging apparatus comprising:

a photographing device for acquiring a created (or photographical) image;

a display device for showing a preview image of the created image; and a control device for superimposing a plurality of outlines on the preview image shown on the display device, and subjecting at least one of areas, which are included in the created image and are surrounded by the outlines in the preview image, to an image transformation process.

As a typical example, the outlines are of constitutions of a face and are arranged to form the face on the display device.

The imaging apparatus may further comprise an operating device for selecting said at least one of the areas, which are included in the created image and are surrounded by the outlines in the preview image, to be subjected to the image transformation process.

The control device can subject the area surrounded by each of said plurality of outlines to an independent image transformation process which is selected from among different independent image transformation processes.

The present invention also provides an imaging apparatus comprising:

a photographing device for acquiring a created image;

a display device for showing a preview image of the created image;

a storage device for storing a synthetic target image indicating a target image of transformation; and a control device for superimposing an outline, which corresponds to the synthetic target image, on the preview image shown on the display device, and subjecting an area, which is included in the created image and is surrounded by the outline in the preview image, to an image transformation process performed based on the synthetic target image.

This imaging apparatus may further comprise a communications device for acquiring data of the synthetic target image from a data service provider.

In this case, data of the outline corresponding to the synthetic target image may also be acquirable via the communications device from the data service provider.

In the imaging apparatus using the synthetic target image, the storage device may store a plurality of synthetic target images which respectively correspond to different and independent outlines.

The present invention also provides an image processing method implemented by an imaging device, wherein:

the imaging device comprises:

a photographing device for acquiring a created image;

a display device for showing a preview image of the created image; and a control device for subjecting the created image to an image transformation process, and the method comprises the steps, executed by the control device, of:

superimposing a plurality of outlines on the preview image shown on the display device, according to a request from a user; and subjecting at least one of areas, which are included in the created image and are surrounded by the outlines in the preview image, to the image transformation process.

The present invention also provides an image processing method implemented by an imaging device, wherein:

the imaging device comprises:

a photographing device for acquiring a created image;

a display device for showing a preview image of the created image;

a storage device for storing a synthetic target image indicating a target image of transformation; and a control device for subjecting the created image to an image transformation process, and the method comprises the steps, executed by the control device, of:

superimposing an outline, which corresponds to the synthetic target image, on the preview image shown on the display device; and subjecting an area, which is included in the created image and is surrounded by the outline in the preview image, to the image transformation process which is performed based on the synthetic target image.

According to the present invention, in an imaging apparatus for performing image transformation of a created image, users' detailed requests for image transformation can be implemented by clearly showing the user target area(s) for image transformation.

DETAILED DESCRIPTION OF THE INVENTION

Hereinafter, an embodiment according to the present invention will be explained with reference to the Figures. In the embodiment, a cellular phone into which a digital camera is built is explained as a specific example of the imaging apparatus.

Figure 1:
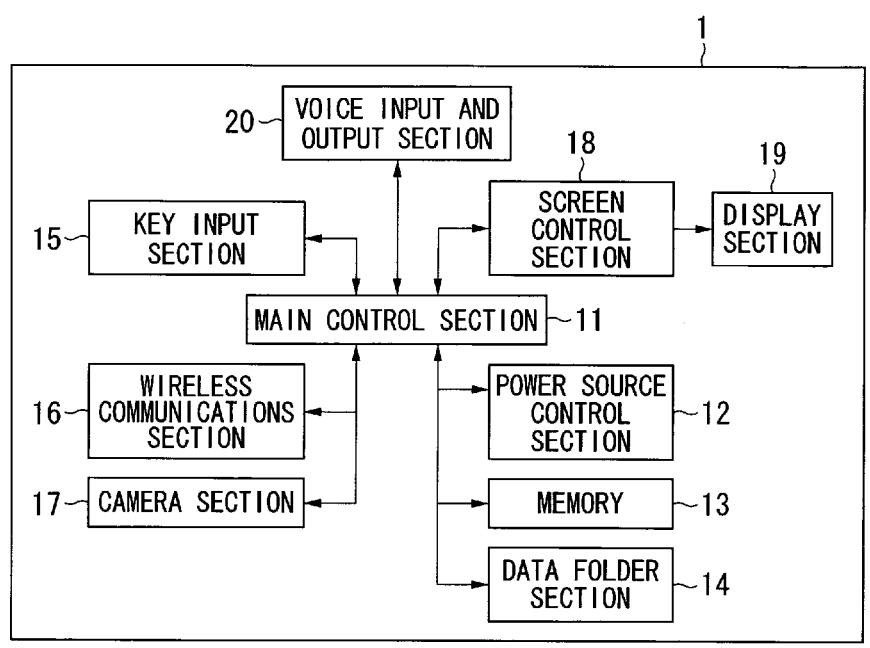
FIG. 1 is a block diagram showing the structure of a cellular phone 1 as an embodiment according to the present invention.

FIG. 1 is a block diagram showing the structure of a cellular phone 1 as an embodiment of the present invention. In FIG. 1, the main control section 11 has main control functions of the cellular phone 1, and controls the other sections of the cellular phone 1. The power source control section 12 has a function of controlling the power source of the cellular phone 1. The memory 13 stores data used in the main control section 11, or the like. The data folder section 14 is a memory device for storing memory data such as image data created by using the camera section 17, and may be writable nonvolatile memory.

The key input section 15 includes ten keys for inputting phone numbers or the like, various sorts of function keys, soft keys (explained later), etc. The wireless communications section 16 performs sending and receiving of wireless signals via an antenna, so as to perform voice conversation or data communications. The camera section 17 has a lens, a CCD (charge-coupled device), a signal processing circuit for generating digital image data from image signals obtained by the CCD, etc. The screen control section 18 controls the screen shown on the display section 19. The display section 19 has a display panel, for example, a liquid crystal display panel. The voice input and output section 20 has a microphone, a speaker, a signal processing circuit for performing conversion between voice signals and digital voice data, etc.

Figure 2:
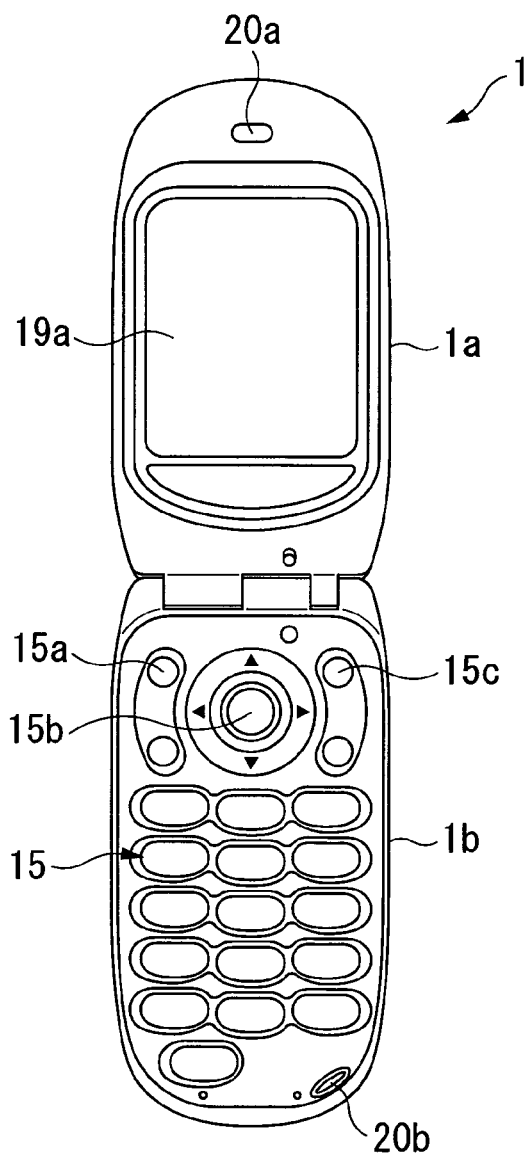
FIG. 2 is a plan view showing an appearance of the cellular phone 1 in FIG. 1.
Figure 3:
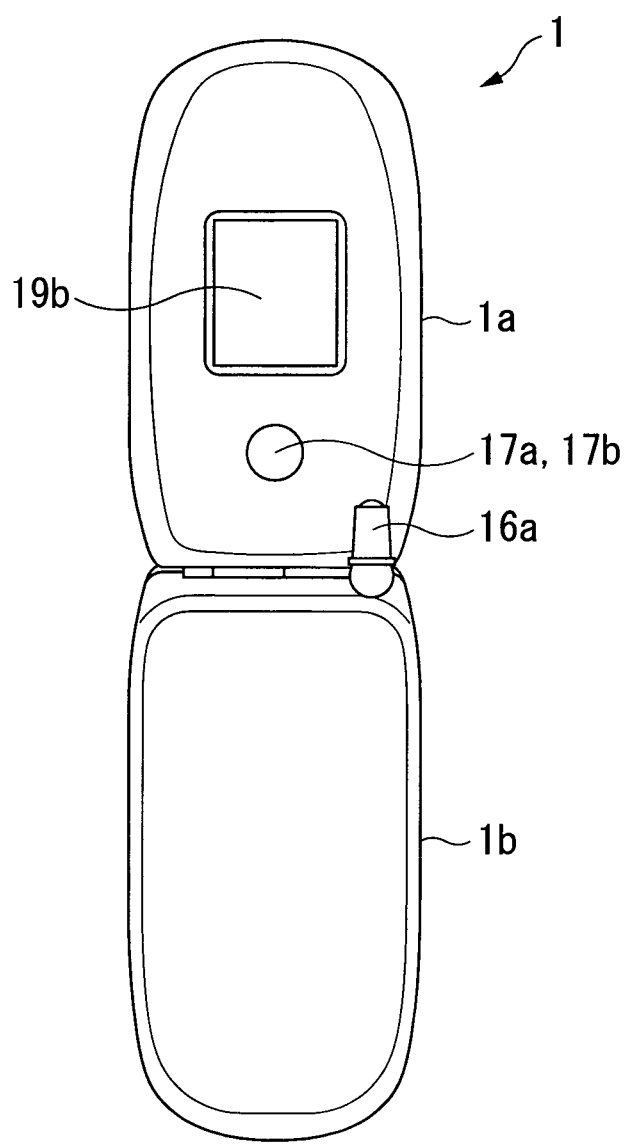
FIG. 3 is a plan view showing another appearance of the cellular phone 1 in FIG. 1.

FIGS. 2 and 3 show appearances of the cellular phone 1 of FIG. 1. The cellular phone 1 is of a folding shape as an example of the structure of the cellular phone. FIG. 2 is a plan view showing the inner faces which face each other when the phone is folded, and FIG. 3 is a plan view showing the outer faces.

In FIG. 2, the cellular phone 1 has a first body 1a and a second body 1b which respectively have inner faces which face each other when the cellular phone 1 is folded. In the inner face of the first body 1a, a first display panel 19a and a speaker 20a are provided. In the inner face of the second body 1b, the key input section 15 and a microphone 20b are provided. The key input section 15 includes soft keys 15a, 15b, and 15c, and the function to be allocated to each soft key can be changed for separate cases by way of software settings. The presently-allocated function is displayed on the display panel 19a in each scene; thus, the user can recognize the present function of each of the soft keys 15a, 15b, and 15c while operating the keys.

In FIG. 3, a second display panel 19b, and a lens 17a and a CCD17b which belong to the camera section 17 are provided in the outer face of the first body 1a. An antenna 16b is attached to the outer face of the second body 1b.

When photographing an image using the cellular phone 1, a preview image of the image created by the camera section 17 is shown on the display panel 19a or 19b. The user confirms a subject to be photographed by watching the preview image, and commands photographing by operating the key input section 15. According to the photographing command, the preview image at the time of commanding is stored as the created image in the data folder section 14.

The main control section 11 performs a morphing process which is an image transformation process. In the morphing process, the image created by the camera section 17 is used as the original image. When a photographing mode for performing morphing is selected by the user, the main control section 11 displays a photographing template superimposed on the preview image. The photographing template is used for clearly indicating photographing areas which can be subjected to the morphing process. Data of the photographing template is stored in the data folder section 14.

Figure 4:
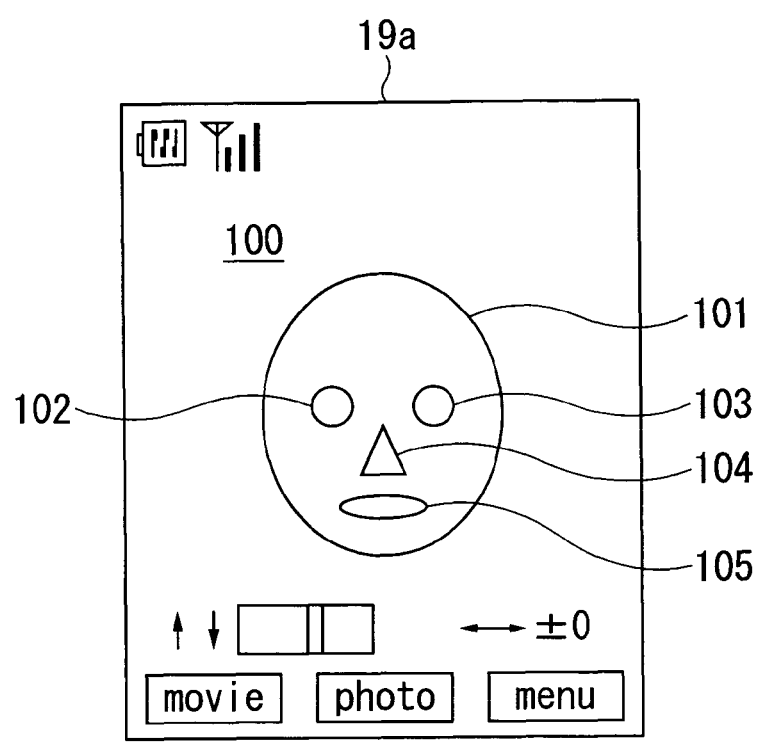
FIG. 4 is a diagram showing an example of the photographing template on the display screen.

FIG. 4 is a diagram showing an example of the photographing template on the display screen. In the example of FIG. 4, a photographing template 100 used for photographing a human face is shown on the display panel 19a. The photographing template 100 consists of an outline 101 of the whole face, an outline 102 of the right eye, an outline 103 of the left eye, an outline 104 of the nose, and an outline 105 of the mouth. The outlines 101 to 105 are arranged to form a human face. The coordinate data of each of the outlines 100 to 105, stored in the data folder section 14 as photographing template data of the photographing template 100, indicates the position of the outline on the display screen.

In the photographing template 100 having the outlines 101 to 105, an area surrounded by each outline is a photographing area which can be subjected to the morphing process. The main control section 11 subjects at least one of the photographing areas, which are respectively surrounded by the outlines 101 to 105 in the created image, to the morphing process. Based on the coordinate data of the outlines 101 to 105, the main control section 11 makes the areas which are respectively surrounded by the outlines 101 to 105 correspond to areas indicated by the coordinate data in the created image. For example, it is determined that the area corresponding to the coordinate data of the outline 102 of the right eye is the area surrounded by the outline 102 in the created image.

When photographing, the user confirms the subject (here, a human) by watching the preview image shown on the display panel 19a (see FIG. 2), and photographs the human's face by adjusting the face to the photographing template on the display screen. Accordingly, the preview image at the time of photographing is stored as the created image in the data folder section 14. The created image includes the image of the face of the subject, which was superimposed on the photographing template 100 on the display screen.

If the eyes of the face of the subject are subjected to the morphing process, the image of the areas corresponding to the outlines 102 and 103 in the created image is selected as the first original image for morphing. The second original image for morphing of the eye portion (i.e., an image used in the morphing process) is selected from transformation candidate data for eyes, which are coordinate data of outlines of the eyes. In order to transform the eyes to any of varies eye shapes such as round eyes, thin eyes, up-turned or down-turned slant eyes, etc., transformation candidate data for outlines of a plurality of eye shapes are stored in the data folder section 14. The main control section 11 executes a morphing process for extracting the outlines of the eyes from the first original image and making transition from the extracted outlines to corresponding outlines in the second original image, so as to generate a transformed image. For example, transition from the outlines of the eyes in the first original image to outlines of round eyes is performed in the morphing process, so that data of an animation image for the transition to the round eyes may be generated, or a still image in the middle of transition may be extracted. One of the eyes, for example, the right eye, may be singly subjected to morphing.

As transformation candidate data of the photographing template 100, in addition to the above-described data for eyes, transformation candidate data for a plurality of outlines for each of the whole face, the nose, and the mouth are stored in the data folder section 14.

The operation flow of the morphing process will be explained below.

Figure 5:
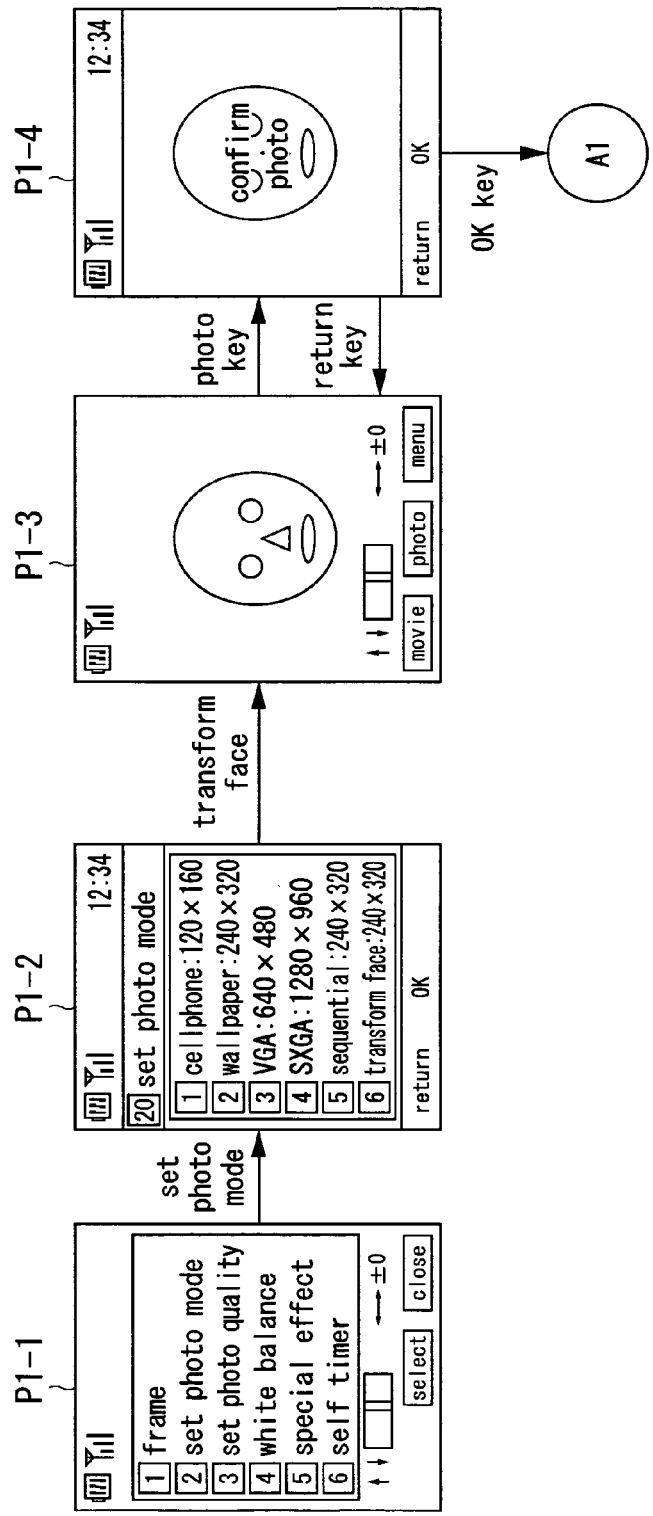
FIG. 5 shows an example of a flow of the screen displayed on the display panel 19a so as to explain the operation flow of a morphing process in the first embodiment.
Figure 7:
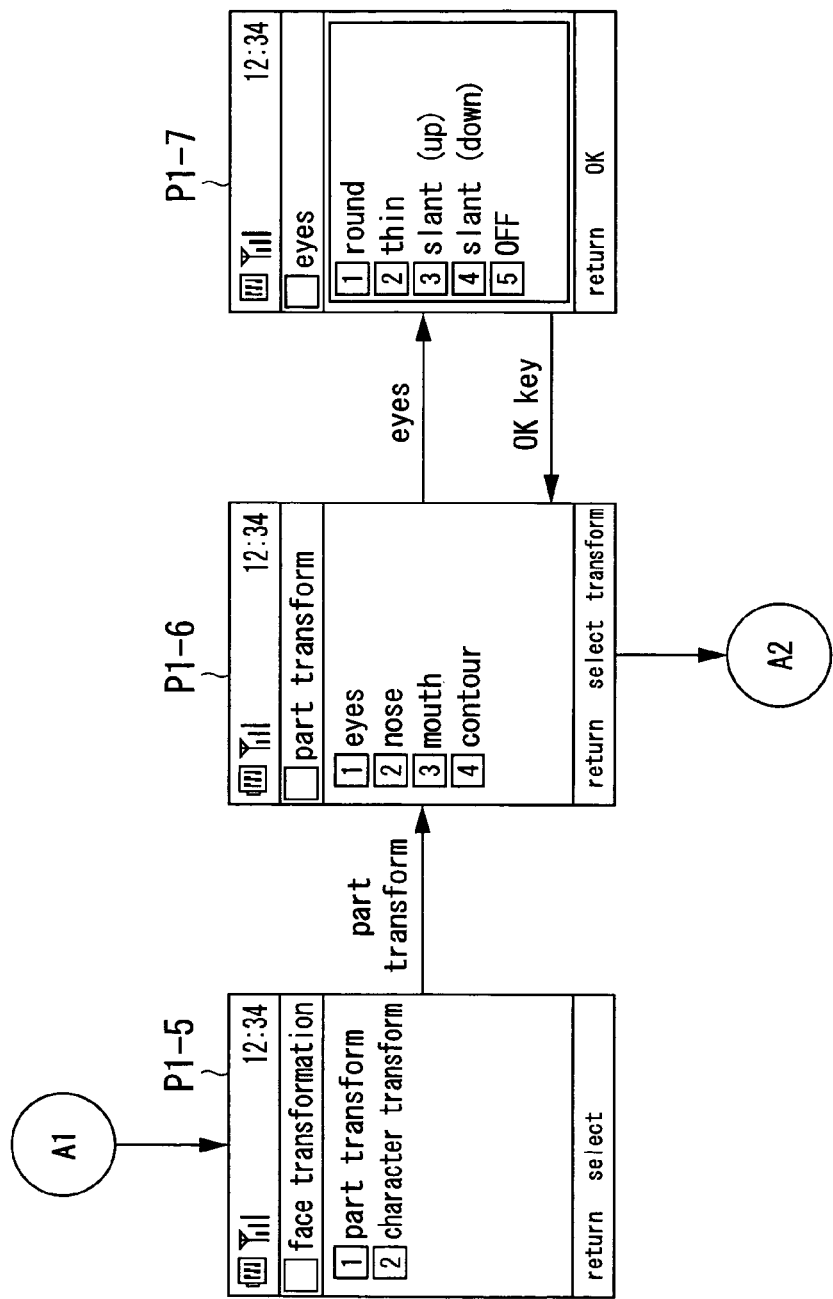
FIG. 7 shows an example of a flow of the screen displayed on the display panel 19a so as to explain the operation flow of a morphing process in the first embodiment.
Figure 8:
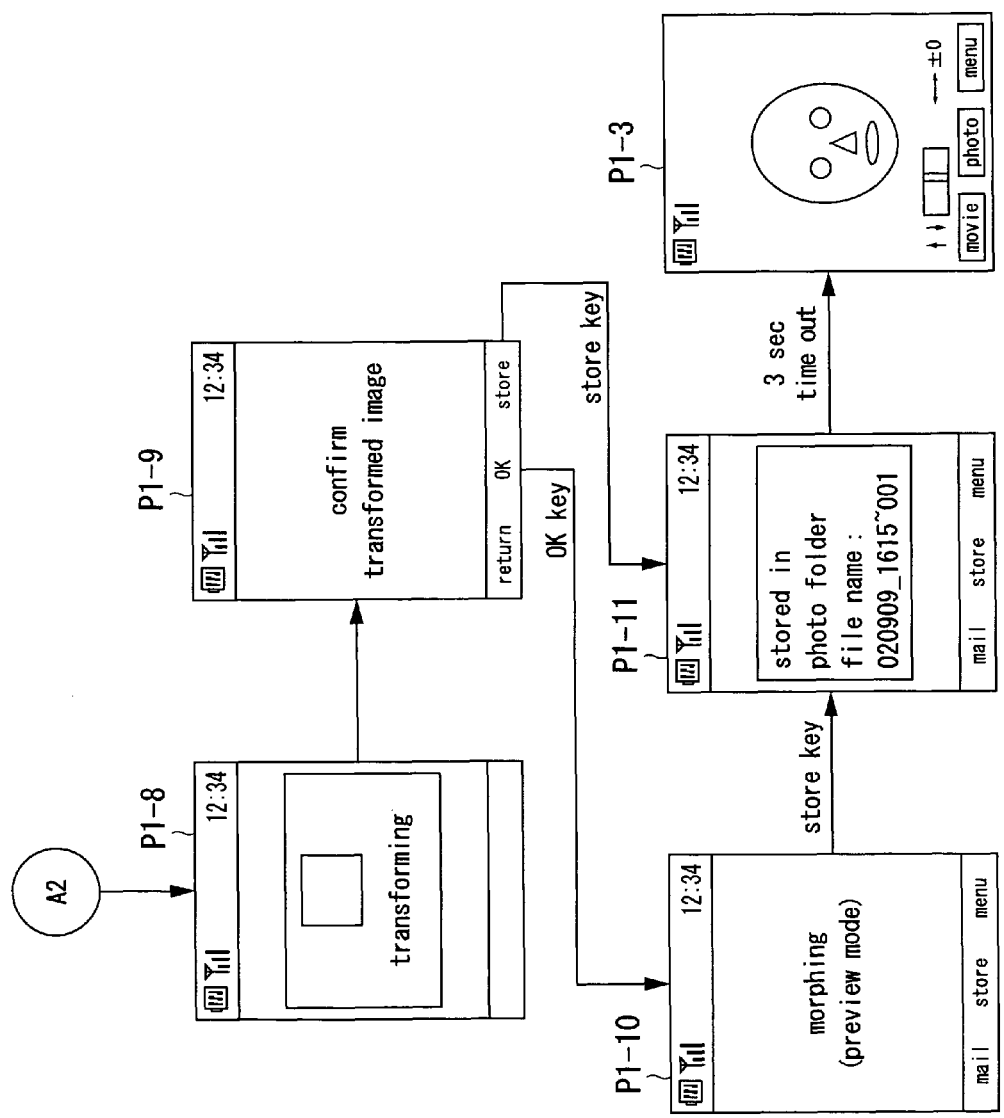
FIG. 8 also shows an example of a flow of the screen displayed on the display panel 19a so as to explain the operation flow of a morphing process in the first embodiment.

FIGS. 5, 7, and 8 show examples of the screen displayed on the display panel 19a so as to explain the operation flow.

First, in FIG. 5, the user acquires a menu selection screen P1-1 by operating the key input section 15. When the user selects "set photo mode" in the menu selection screen P1-1, the main control section 11 displays a photographing mode setting screen P1-2. When the user selects "transform face" in the photographing mode setting screen P1-2, the main control section 11 retrieves data of the photographing template 100 for face transformation from the data folder section 14, and displays the photographing template 100 in a photographing preview screen P1-3. Therefore, the photographing preview screen P1-3 includes a preview image and the photographing template 100, which is superimposed on the preview image.

Figure 6:
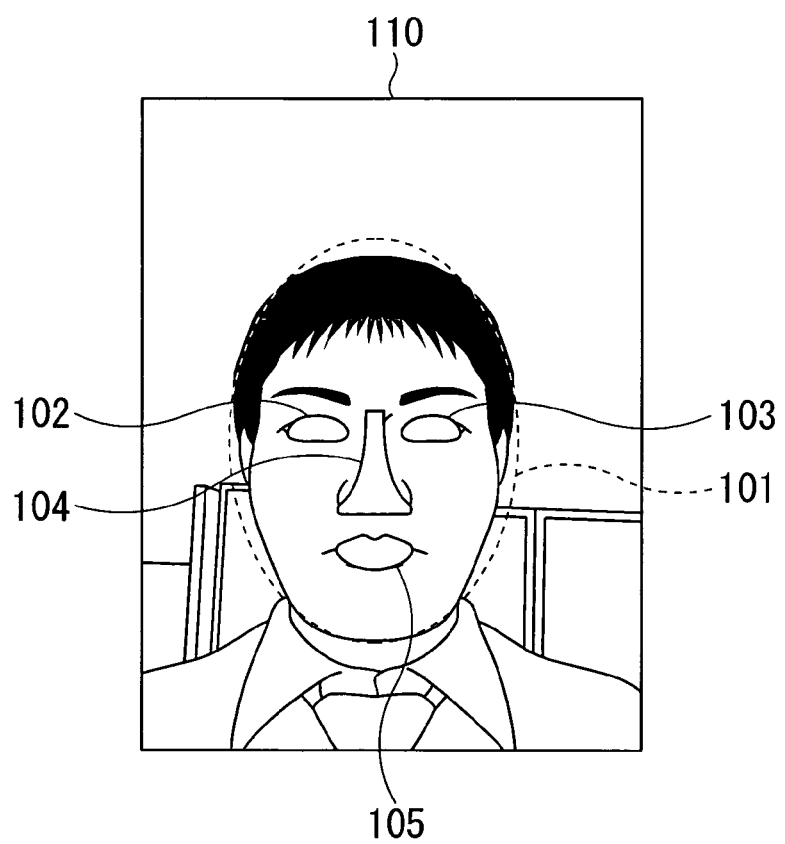
FIG. 6 shows an example of the image shown in the photographing preview screen P1-3.

FIG. 6 shows an example of the image shown in the photographing preview screen P1-3. As shown in FIG. 6, the photographing template 100, superimposed on the preview image, consists of the outline 101 of the whole face, the outline 102 of the right eye, the outline 103 of the left eye, the outline 104 of the nose, and the outline 105 of the mouth. The outlines 101 to 105 are arranged so as to form a human's face. In FIG. 6, according to the user's control of the camera angle or the like, the human face of the subject is adjusted to the photographing template 100 in a manner such that the right eye, the left eye, the nose, and the mouth are respectively adjusted to the outlines 102, 103, 104, and 105.

Next, when the user pushes the "photo" key (here, the soft key 15b), the main control section 11 stores the preview image at the time of pushing the "photo" key as the created image in the data folder section 14. The created image is displayed in a created image confirmation screen P1-4. The user confirms the subject by watching the created image confirmation screen P1-4, and pushes the OK key (here, the soft key 15b) if no problem is found.

If the user is not satisfied with the created image after checking the created image confirmation screen P1-4, the user can acquire the photographing preview screen P1-3 again by pushing the "return" key (here, the soft key 15a). In this case, the main control section 11 erases the created image stored in the data folder section 14.

When the OK key (here, the soft key 15b) is pushed in the created image confirmation screen P1-4, the main control section 11 displays a face transformation menu screen P1-5 (see FIG. 7). When the user selects "part transform" in the face transformation menu screen P1-5 and pushes the "select" key (here, the soft key 15b), the main control section 11 displays a part transformation menu screen P1-6 in which the names of constitutions of the face (i.e., "eyes", "nose", "mouth", and "contour") which can be subjected to morphing are shown as menu items. According to the part transformation menu screen P1-6, the user can freely select any of the constitutions of the face (i.e., the eyes, the nose, the mouth, and the contour of the whole face) to be subjected to morphing.

If the user selects "eyes" in the part transformation menu screen P1-6 and pushes the "select" key (here, the soft key 15b), the main control section 111 displays an eye transformation candidate menu screen P1-7 in which names indicating possible transformed eye shapes (i.e., "round", "thin", "slant (up)", "slant (down)") are shown as menu items. According to the eye transformation candidate menu screen P1-7, the user can select any of possible eye shapes (i.e., round eyes, thin eyes, up-turned slant eyes, and down-turned slant eyes) as target transformed eyes. If the user selects the item "slant (down)" and pushes the OK key (i.e., the soft key 15b), the main control section 11 selects the down-turned slant eyes as the candidate for transformed eyes. Then, the part transformation menu screen P1-6 is displayed again. If the user selects "OFF" in the eye transformation candidate menu screen P1-7, the eye transformation can be canceled.

In addition, the user can select a plurality of constitutions of the face to be subjected to morphing. If the user wants the eyes and mouth to be subjected to morphing, the user may select "eyes" in the part transformation menu screen P1-6 and then select a transformation candidate for the eyes in the eye transformation candidate menu screen P1-7, and then select "mouth" in the part transformation menu screen P1-6 which is displayed again, and then select a transformation candidate for the mouth in a mouth transformation candidate menu screen, similarly.

After completion of the selection of constitution(s) of the face for morphing and each transformation candidate, the user pushes the "transform" key (here, the soft key 15c) in the part transformation menu screen P1-6. Accordingly, the main control section 11 starts the morphing process and displays a transformation processing screen P1-8 in FIG. 8. The main control section 11 retrieves coordinate data of each target constitution of the face and of each transformation candidate from the data folder section 14, and executes the morphing process by using the retrieved coordinate data and the created image stored in the data folder section 14. During the morphing process, an animation image or the like may be displayed on the transformation processing screen P1-8. Accordingly, even if a considerable period of time is taken for processing, it is possible to cause the user less inconvenience.

After completion of the morphing process, the main control section 11 displays a transformed image confirmation screen P1-9 which includes a transformed image as a result of the morphing process.

Figure 9:
FIG. 9 shows an example of the transformed image in the first embodiment.
Figure 10:
FIG. 10 shows the created image 121 as the original image for morphing, so as to produce the transformed image in FIG. 9.

FIG. 9 shows an example of the transformed image in the first embodiment. The transformed image 120 in FIG. 9 is obtained by subjecting only the eyes of the subject, which is a human, to the morphing process so as to transform the eyes to the down-turned slant eyes. FIG. 10 shows the created image 121 as the original image for morphing.

When the user pushes the "store" key (here, the soft key 15c) in the transformed image confirmation screen P1-9, the main control section 111 stores the transformed image in the data folder section 14. The main control section 11 then displays a storage screen P1-111.

When the user pushes the OK key (here, the soft key 15b) in the transformed image confirmation screen P1-9, the main control section 111 displays a morphing preview screen P1-10 in which data of an animation image from the originally created image to the transformed image are reproduced. When the user pushes the "store" key (here, the soft key 15b) in the morphing preview screen P1-10, the main control section 11 stores the animation data in the data folder section 14. The main control section 11 then displays the storage screen P1-11.

When a specific period of time (e.g., 3 seconds) has elapsed while showing the storage screen P1-11, the main control section 11 displays the photographing preview screen P1-3 again, so that photographing is possible again.

According to the above first embodiment, photographing areas as the target for morphing can be clearly shown by using a plurality of outlines which are superimposed on a preview picture. Accordingly, when the user performs photographing while adjusting desired part(s) of the subject for morphing to corresponding outline(s), the user can easily acquire an image including transformed results of the desired part(s) of the subject, based on the created image. Therefore, according to the present embodiment, the user's request for partially transforming the subject can be implemented.

In addition, according to the photographing template of the human face, it is easy to photograph a human's face and partially transform the photographed face. Instead of humans, templates for faces of animals such as dogs or cats may be provided. Accordingly, a face of the image of a pet such as a pet dog can be easily transformed.

Furthermore, part(s) of the subject for morphing can be selected after photographing, thereby improving convenience of the user.

Additionally, a plurality of image transformation patterns can be provided for a single target area for transformation, thereby improving flexibility of transformation for the user.

For example, when the eyes are transformed, the user can flexibly select a target transformed eye shape from among various kinds of eye shapes such as round eyes, thin eyes, and up-turned or down-turned slant eyes.

Figure 11:
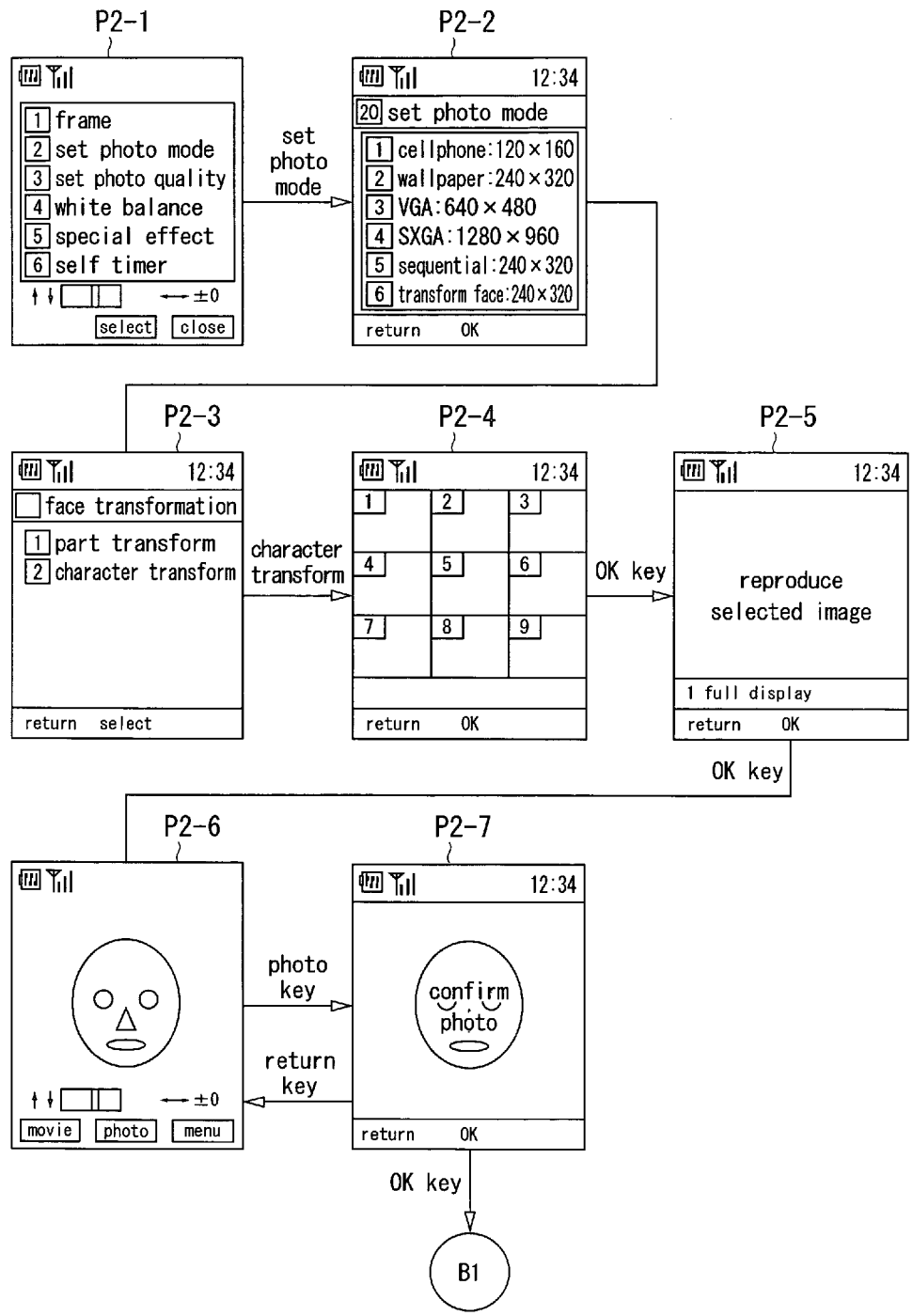
FIG. 11 shows an example of a flow of the screen displayed on the display panel 19a so as to explain the operation flow of a morphing process in the second embodiment.
Figure 13:
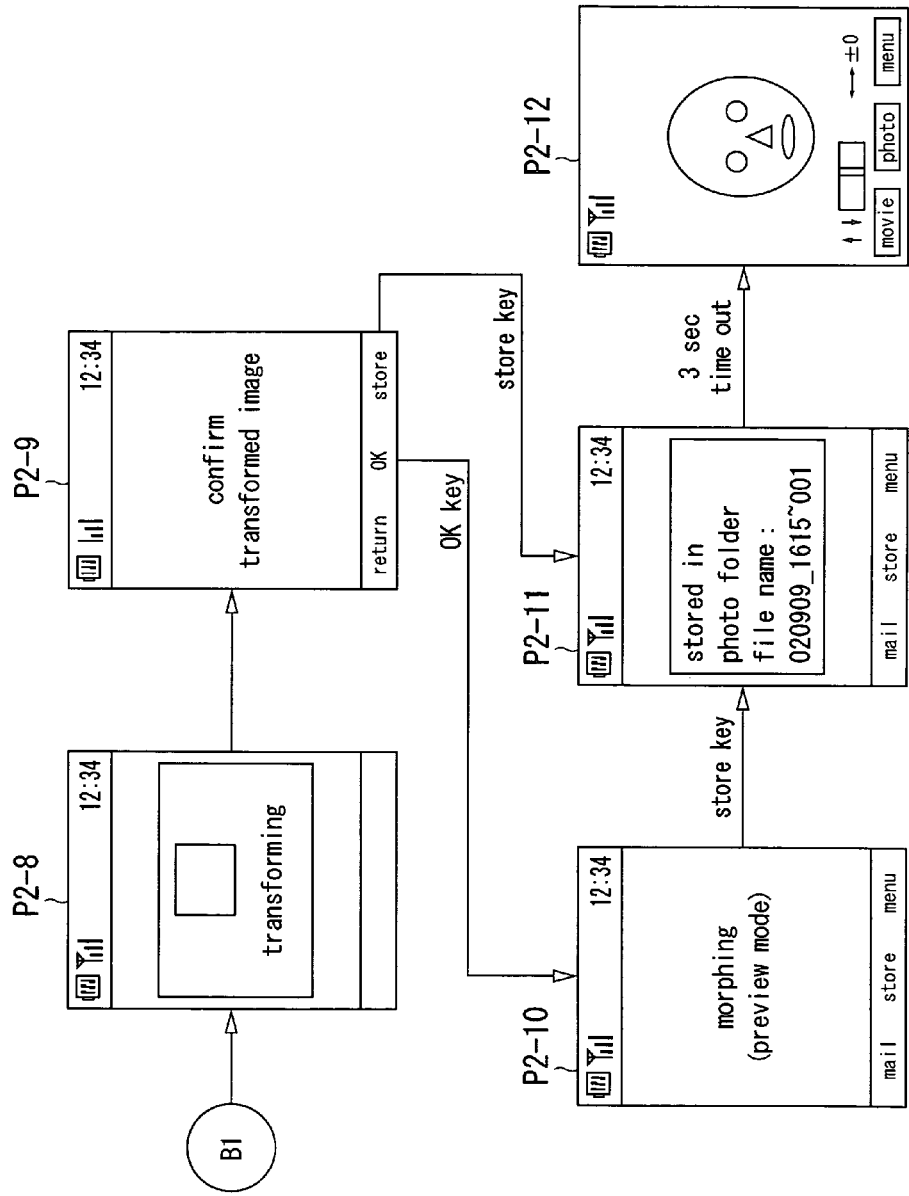
FIG. 13 shows an example of a flow of the screen displayed on the display panel 19a so as to explain the operation flow of a morphing process in the second embodiment.

The second embodiment of the present invention will be explained below. FIGS. 11 and 13 show examples of the screen displayed on the display panel 19a for explaining the operation flow of the morphing process in the second embodiment. The imaging apparatus in the second embodiment has basically the same structure as that in the above-explained cellular phone 1.

Similar to in the first embodiment, in the second embodiment, the main control section 11 performs the morphing process as an image transformation process. The first original image used for morphing is the image created by the camera section 17 as in the first embodiment; however, a synthetic target image is used as the second original image. The synthetic target image is a target transformed image for the created image and is created by a camera or the like, or produced, in advance. The synthetic target image may be an image of a front view of a train, an animation character, a face of an animal such as a dog, or the like. Data of each synthetic target image and coordinate data of each synthetic target image are stored in the data folder section 14.

For each synthetic target image, a dedicated photographing template is provided. The provided synthetic target images have different forms and sizes; thus, a common template for photographing may degrade the accuracy in extraction of feature points in the morphing process. Therefore, a photographing template suitable for each synthetic target image is prepared. Data of each photographing template (i.e., coordinate data) is stored in the data folder section 14.

With reference to FIG. 11, the user first selects "set photo mode" in a menu selection screen P2-1 by operating the key input section 15, and then selects "transform face" in a photographing mode setting screen P2-2. Accordingly, the main control section 11 displays a face transformation menu screen P2-3. Next, when the user selects "character transform" in the face transformation menu screen P2-3 and pushes the "select" key (here, the soft key 15b), the main control section 11 displays a character selection menu screen P2-4 in which synthetic target images, which can be original images for morphing, are displayed as menu items. According to the character selection menu screen P2-4, the user can select any synthetic target image to which the subject in the created image is to be transformed.

Figure 12:
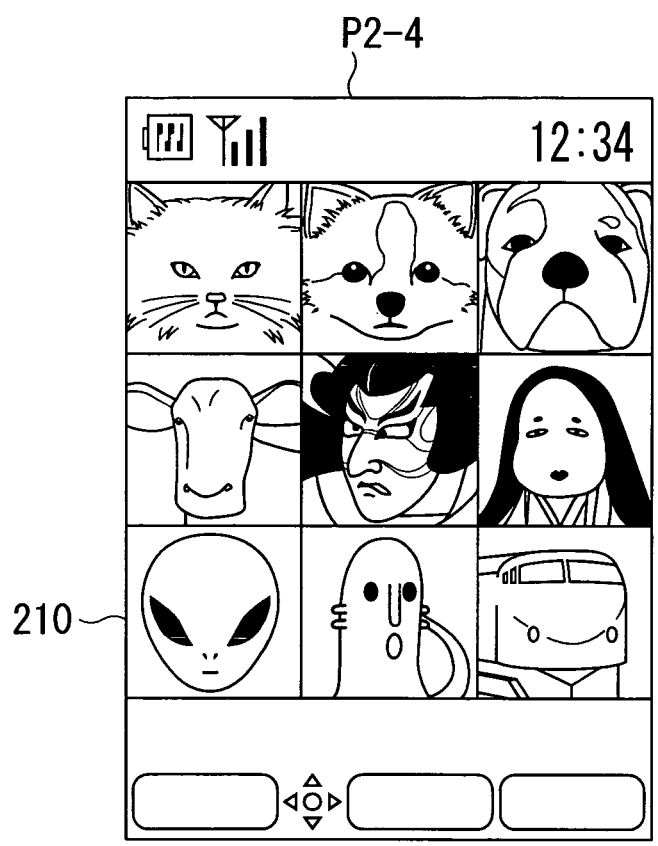
FIG. 12 shows an example of the character selection menu screen P2-4.

FIG. 12 shows an example of the character selection menu screen P2-4. In this example, faces of animals such as a dog and a cat, faces of animation characters, a front view of a train, etc., are shown as candidates for the synthetic target image.

When the user selects a synthetic target image and pushes the OK key (here, the soft key 15b), the main control section 11 retrieves image data of the selected synthetic target image from the data folder section 14, and displays the retrieved data in a selected image reproduction screen P2-5. The user confirms the selected synthetic target image by watching the selected image reproduction screen P2-5, and pushes the OK key (here, the soft key 15b). If the user is not satisfied with the selected image, the user may push the "return" key (here, the soft key 15a) so as to display the character selection menu screen P2-4 again, and select a desired synthetic target image again.

When the OK key (here, the soft key 15b) is pushed in the selected image reproduction screen P2-5, the main control section 11 retrieves the data of the selected synthetic target image from the data folder section 14 and displays the retrieved data in a photographing preview screen P2-6. The photographing preview screen P2-6 includes the preview image and the photographing template which is superimposed on the preview image.

When the user photographs the subject while adjusting the position of the subject to the photographing template, the main control section 11 stores the preview image at the time of photographing as the created image in the data folder section 14, and displays the created image in a created image confirmation screen P2-7. The user confirms the subject in the created image confirmation screen P2-7 and pushes the OK key (here, the soft key 15b) if no problem is found. Accordingly, the main control section 11 starts the morphing process and displays a transformation processing screen P2-8 in FIG. 13. The main control section 11 retrieves the data of the synthetic target image as a target for morphing from the data folder section 14, and executes the morphing process by using the synthetic target image data and the created image stored in the data folder section 14.

After completion of the morphing process, the main control section 11 displays a transformed image confirmation screen P2-9 which includes a transformed image as a result of the morphing process.

Figure 14:
FIG. 14 shows an example of the transformed image in the second embodiment.

FIG. 14 shows an example of the transformed image in the second embodiment. The transformed image 200 in FIG. 14 is obtained by the morphing process in which the face of a human as the subject in the created image 121 in FIG. 10 is transformed based on a synthetic target image 210 in FIG. 12.

When the user pushes the "store" key (here, the soft key 15c) in the transformed image confirmation screen P2-9, the main control section 11 stores the transformed image in the data folder section 14 and displays a storage screen P2-11.

When the user pushes the OK key (here, the soft key 15b) in the transformed image confirmation screen P2-9, the main control section 11 displays a morphing preview screen P2-10 in which data of an animation image from the originally created image to the transformed image are reproduced. When the user pushes the "store" key (here, the soft key 15b) in the morphing preview screen P2-10, the main control section 11 stores the animation data in the data folder section 14. The main control section 11 then displays the storage screen P2-11.

When a specific period of time (e.g., 3 seconds) has elapsed while showing the storage screen P2-11, the main control section 11 displays the photographing preview screen P2-6 again, so that photographing is possible again.

According to the above second embodiment, the photographing area as the target for morphing using the synthetic target image can be clearly shown by using an outline superimposed on a preview picture. Accordingly, when the user photographs while adjusting a desired portion of the subject for morphing to an outline which corresponds to the selected synthetic target image, the user can easily obtain an image according to the morphing process performed based on (i) a desired portion of the subject (i.e., a portion desired by the user for morphing) in the created image and (ii) the synthetic target image.

In addition, a plurality of synthetic target images which can be used in morphing can be provided, and a created image of the subject, to be subjected to morphing, can be acquired by using a photographing template which corresponds to the selected synthetic target image. Accordingly, an image of the subject which matches the synthetic target image can be obtained, thereby obtaining the best synthetic image.

In the above second embodiment, data of the synthetic target image and the photographing template for the synthetic target image may be downloaded via a wireless communications line from a server of a service provider for providing such data, so that the downloaded data can be stored in the data folder section 14. Accordingly, the synthetic target image and the photographing template can be easily supplemented through data communications. Preferably, a list of the synthetic target images stored on the server (e.g., a list of relevant images themselves) is shown on a display of the cellular phone, so that the user can select any image in the list and download the selected image.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the photographing template is not limited to those for faces and may be implemented by an outline for photographing the whole body of a human or an animal.

In addition, the imaging apparatus is not always implemented as a cellular phone having a built-in digital camera. The imaging apparatus may be implemented as a portable data terminal or a personal computer which also has a built-in digital camera, or may be a digital camera itself.

What is claimed is:

1. A portable imaging apparatus comprising:
    a photographing device for acquiring a created image which has not yet been stored;
    a display device for showing a preview image viewed by a user before acquiring the created image;
    an operation device, operated by the user, for making the photographing device capture the preview image as the created image; and
    a control device for
        superimposing a plurality of predetermined outlines, that show predetermined areas of the preview image which are each able to be subjected to a morphing process, onto the preview image shown on the display device before acquiring the created image so that the preview image can be adjusted to the outlines by an operation of the user, and
        subjecting at least one, selected by the user, of the areas of the created image surrounded by the superimposed outlines in the preview image to the morphing process.

2. The portable imaging apparatus as claimed in claim 1, wherein the outlines are of constitutions of a face and are arranged to form the face on the display device.

3. The portable imaging apparatus as claimed in claim 1, further comprising:
    an operating device for selecting said at least one of the areas, which are included in the created image and are surrounded by the outlines in the preview image, to be subjected to the morphing process.

4. The portable imaging apparatus as claimed in claim 1, wherein the control device can subject the areas surrounded by each of said plurality of outlines to an independent morphing process which is selected from among different independent morphing processes.

5. A portable imaging apparatus comprising:
    a photographing device for acquiring a created image which has not yet been stored;
    a display device for showing a preview image viewed by a user before acquiring the created image;

an operation device, operated by the user, for making the photographing device capture the preview image as the created image;

a storage device for storing a synthetic target image indicating a target image of transformation; and a control device for superimposing a predetermined outline, that shows a predetermined area of the synthetic target image, the area being able to be subjected to a morphing process, onto the preview image shown on the display device before acquiring the created image so that the preview image can be adjusted to the outline by an operation of the user, and subjecting an area of the created image surrounded by the superimposed outline in the preview image to the morphing process performed based on the synthetic target image.

6. The portable imaging apparatus as claimed in claim 5, further comprising:

a communications device for acquiring data of the synthetic target image from a data service provider.

7. The portable imaging apparatus as claimed in claim 6, wherein data of the outline corresponding to the synthetic target image is also acquirable via the communications device from the data service provider.

8. The portable imaging apparatus as claimed in claim 5, wherein:

the storage device stores a plurality of synthetic target images which respectively correspond to different and independent outlines.

9. The portable imaging apparatus as claimed in claim 5, wherein the morphing process produces an animation image of the transition between the created image and the synthetic target image.

10. An image processing method implemented by an imaging device, wherein:

the imaging device comprises:

a photographing device for acquiring a created image which has not yet been stored;

a display device for showing a preview image viewed by a user before acquiring the created image;

an operation device, operated by the user, for making the photographing device capture the preview image as the created image; and a control device for subjecting the created image to a morphing process, and the method comprises the steps, executed by the control device, of:

superimposing a plurality of predetermined outlines, that show predetermined areas of the preview image which are able to be subjected to the morphing process, onto the preview image shown on the display device, according to a request from the user before acquiring the created image so that the preview image can be adjusted to the outlines by an operation of the user, and subjecting at least one, selected by the user, of the areas of the created image surrounded by the superimposed outlines in the preview image to the morphing process.

11. An image processing method implemented by an imaging device, wherein:

the imaging device comprises:

a photographing device for acquiring a created image which has not yet been stored;

a display device for showing a preview image viewed by a user before acquiring the created image;

an operation device, operated by the user, for making the photographing device capture the preview image as the created image;

a storage device for storing a synthetic target image indicating a target image of transformation; and a control device for subjecting the created image to a morphing process, and the method comprises the steps, executed by the control device, of:

superimposing a predetermined outline, that shows a predetermined area of the synthetic target image, the area being able to be subjected to the morphing process, onto the preview image shown on the display device, according to a request from the user before acquiring the created image so that the preview image can be adjusted to the outline by an operation of the user, and subjecting an area of the created image surrounded by the superimposed outline in the preview image to the morphing process performed based on the synthetic target image.

* * * * *